United States Patent [19]

Parker

[11] Patent Number: 5,355,616
[45] Date of Patent: Oct. 18, 1994

[54] FISHING LURE

[76] Inventor: Michael H. Parker, P.O. Box 201407, Anchorage, Ak. 99520

[21] Appl. No.: 143,648

[22] Filed: Nov. 1, 1993

[51] Int. Cl.[5] .................... A01K 85/00; A01K 85/01
[52] U.S. Cl. .................................. 43/43.14; 43/42.06
[58] Field of Search ............... 43/43.14, 42.06, 42.22, 43/42.31, 42.39, 42.49, 43.1, 42.74

[56] References Cited

U.S. PATENT DOCUMENTS

| | | | |
|---|---|---|---|
| 1,344,176 | 6/1920 | Cressler et al. | 43/43.14 |
| 2,121,279 | 6/1938 | Beck | 43/43.14 |
| 2,862,325 | 12/1958 | Magnus | 43/42.22 |
| 3,221,435 | 12/1965 | Moore | 43/42.22 |

Primary Examiner—P. Austin Bradley
Assistant Examiner—Jeanne M. Elpel
Attorney, Agent, or Firm—Hugh E. Smith

[57] ABSTRACT

A fishing rig for sport fishing applications. The fishing rig comprises a hollow cylinder having a top end and a bottom end. A top cap is removably coupled to the top end. A bottom cap is removably coupled to the bottom end. The apparatus includes a first top swivel removably coupled to the top cap for receiving a fishing line. The fishing rig further includes a second top swivel which is removably coupled to the top cap in diametrical opposition to the first top swivel. A bottom swivel and hook is removably coupled to a swivel at the bottom end cap. A metal crimped-sleeve leader and hook is operatively coupled to the second top swivel.

7 Claims, 4 Drawing Sheets

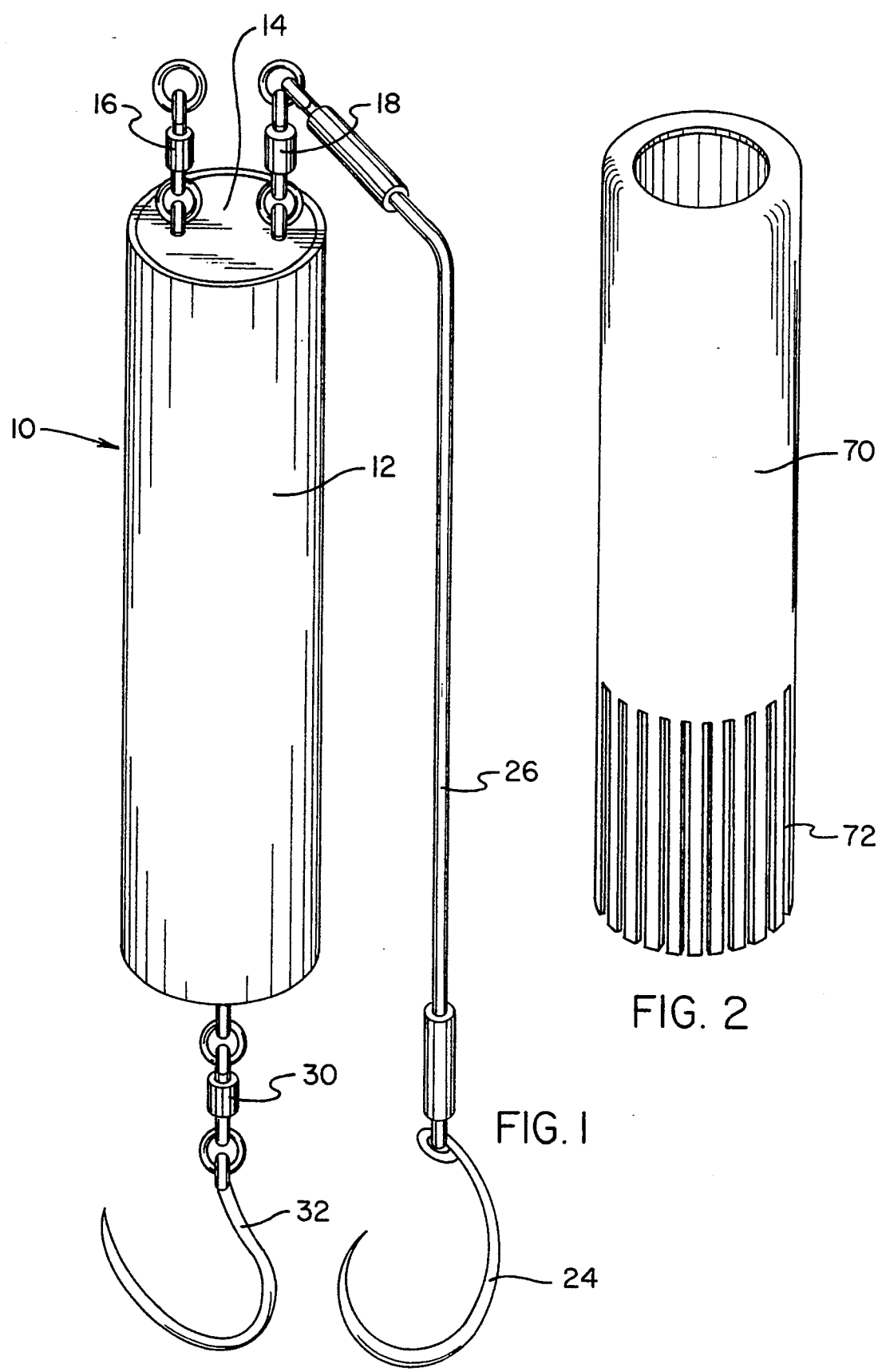

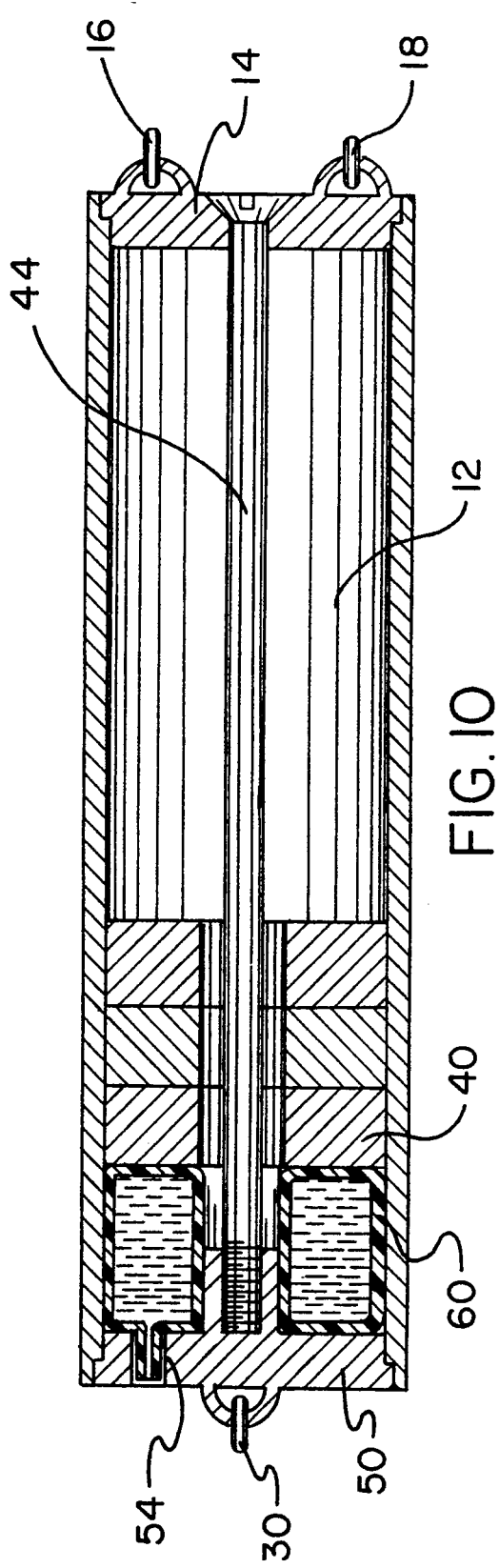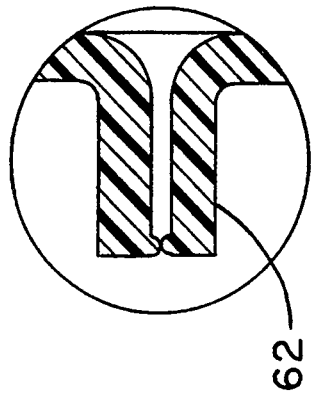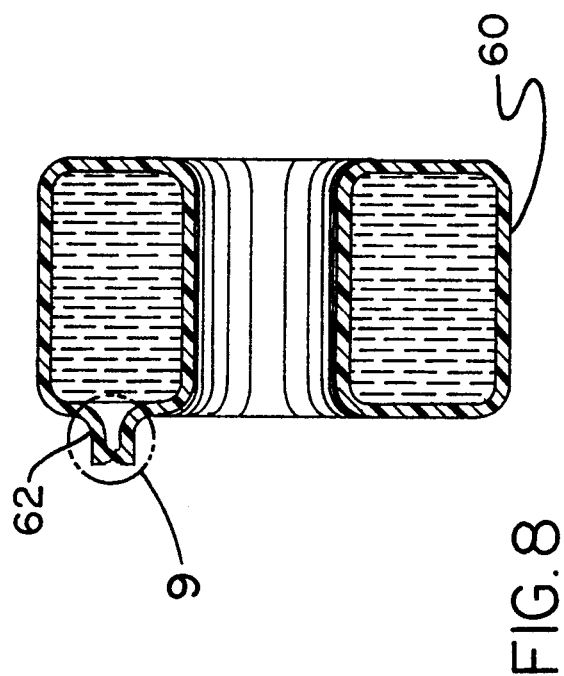

FISHING LURE

BACKGROUND OF THE INVENTION

1. Field of the Invention

The present invention relates to fishing rigs and more particularly pertains to fishing which may be utilized in deep-sea sport fishing.

2. Description of the Prior Art

The use of fishing rigs is known in the prior art. More specifically, fishing rigs heretofore devised and utilized for the purpose of sport fishing are known to consist basically of familiar, expected and obvious structural configurations, notwithstanding the myriad of designs encompassed by the crowded prior art which have been developed for the fulfillment of countless objectives and requirements.

The present invention is directed to improving devices for fishing rigs in a manner which is safe, secure, economical and aesthetically pleasing.

For example, U.S. Pat. No. 4,175,349 to Eagel discloses a fish lure device comprising metal strip and hook assemblies which alternately come together and kick out as the lure is raised and lowered respectively.

A fishing lure device having a lip and elements provided for preventing algae and seaweed from being caught and collecting between the fishing line and lip as the lure is pulled in the water is disclosed by U.S. Pat. No. 4,819,365 to Landuydt.

U.S. Pat. No. 3,966,151 to Hawkins describes a bottom fishing device comprising a clamp which secures a deep-sea fishing rod to the siderail of a vessel.

Another patent of interest is U.S. Pat. No. 5,065,541 to Coody disclosing artificial fishing lures which employ long-fiber wool sheepskin bodies.

Finally, U.S. Pat. No. 4,450,645 to Ancona discloses a crayfish-imitating bottom fishing lure consisting of a weighted, non-buoyant head, to be pulled by fishing line along the seabed while dragging a trailing bait on a hook with resilient legs which impart a 'walking' motion to the apparatus when dragged.

The fishing lures mentioned above, while sufficient for their intended usages, do not specifically address the requirements for a fishing lure to be used as a squid imitation in deep-sea fishing environs.

Strong sea currents often pose a challenge to the angler who wishes to drop his lure as close as possible to directly underneath his vessel. Additional weights must usually be added to the lure to compensate for the sideways influence of the sea currents. Since conventional fishing lures have no internal means for setting an optimum buoyancy adjustment, additional external weight must be appended for negative buoyancy. While this appending of weights does make the lure heavier, it often produces the unintended effects of making the lure look less realistic, encumbering it and producing undesirable action, and increasing the likelihood of it becoming entangled on an obstruction, resulting in loss. On the other hand, should sea current be minimal and less weight than usual is required, a conventional lure generally has no means of achieving neutral buoyancy without the attachment of external floats, which again, can adversely impact both the action and the appearance of the device.

Related to the issue of buoyancy, and specifically arising from it, the present invention will hold to a vertical orientation when being raised and lowered in a jigging motion by the fisherman. This bearing and motion is imitative of squid, which are known to exhibit bursts of speed in the vertical plane when fleeing predatory fish.

Conventional lures usually make no provision for the controlled dispersal of attractant. Attractant must be applied externally to a conventional lure. Consequently, there is no guarantee that there will be any attractant remaining when the lure has arrived at its optimum location. The present invention houses an annular rubber bladder which disperses fish scent fluid upon being jigged by the angler.

In this respect, the fishing rig according to the present invention substantially departs from the conventional concepts and designs of the prior art, and in so doing provides an apparatus primarily developed for the purpose of fishing.

Therefore, it can be appreciated that there exists a continuing need for new and improved fishing rigs which can be used to attract and catch fish. In this regard, the present invention substantially fulfills this need.

As illustrated by the background art, efforts are continuously being made in an attempt to devise fishing rigs used to attract and catch fish. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of fishing rigs used to attract and catch fish now present in the prior art, the present invention provides an improved fishing rig wherein buoyancy and effective response of the rig may be adjusted by the angler to suit local conditions through the selection and placement of annular weights and annular buoyant materials, and which provides a means of dispersing fish liquid scent from an annular rubber bladder, and utilizes an undulating, fringed, dye-accepting fabric skirt covering the cylinder exterior to imitate a major natural prey of deepwater fish, a squid. The fish rig further imitates a squid in its tubular shape and size, the lifelike vertical up-and-down motion imparted by the angler or sea currents as enabled by the adjustable buoyancy selected by the angler after considering the water density, currents, and other influencing local factors attending the depths inhabited by feeding fish. As such, the general purpose of the present invention, which will be described subsequently in greater detail, is to provide a new and improved fishing rig apparatus which has many of the advantages of the fishing rigs mentioned heretofore and many novel features that result in a fishing rig which is not anticipated, rendered obvious, suggested, or even implied by any of the prior art fishing rigs, either alone or in any combination thereof and which has none of the disadvantages of the prior art fishing rigs.

The invention is defined by the appended claims with the specific embodiment shown in the attached drawings. For the purpose of summarizing the invention, the invention may be incorporated into a new and improved fishing rig, comprising a hollow cylinder having a top end and a bottom end. The fishing rig further comprises a top cap removably coupled to the top end and a bottom cap removably coupled to the bottom end. A first top swivel is removably coupled to the top cap for receiving a fishing line and a second top swivel is removably coupled to the top cap. The second top swivel is diametrically opposed to the first top swivel. A bottom swivel, is removable coupled to the bottom cap. A first hook means is operatively coupled to the second top swivel; a second hook means operatively coupled to the bottom swivel.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention, a new and improved fishing rig, comprising a hollow cylinder having a top end and a bottom end; a top cap removably coupled to the top end; a bottom cap removably coupled to the bottom end; a first top swivel removably coupled to the top cap for receiving a fishing line; a second top swivel removably coupled to the top cap diametrically opposed to the first top swivel; a bottom swivel removably coupled to the bottom end cap; a first hook means operatively coupled to the second top swivel; a second hook means operatively coupled to the bottom swivel.

It is another object of the present invention to provide a new and improved fishing rig which may be easily and efficiently manufactured and marketed.

It is a further object of the present invention to provide a new and improved fishing rig which is of a durable and reliable construction.

An even further object of the present invention is to provide a new and improved fishing rig which is susceptible of a low cost of manufacture with regard to both materials and labor, and which accordingly is then susceptible of low prices of sale to the consuming public, thereby making such fishing rigs economically available to the buying public.

Still yet another object of the present invention is to provide a new and improved fishing rig which provides in the apparatuses and methods of the prior art some of the advantages thereof, while simultaneously overcoming some of the disadvantages normally associated therewith.

It is another object of the invention to provide a cylindrical body of a durable, non-ferrous construction which will render it resistant to damage from contact with undersea obstructions, electrolysis, and the teeth of large fish, and will have sufficient mass and an optimum shape for sustained rapid descent to the desired depth.

It is another object of the invention to provide a hook and leader assembly on the rigs top end and a bottom swivel accepting attachment of pendant fishing hooks of various sizes and styles according to the fish sought.

It is another object of the invention to provide placement of the pendant hooks which facilitate capture of fish striking at the fishing rig from either below, or from the side.

It is another object of the invention to provide placement of the pendant hooks in such a manner that an up-and-down motion applied by the fisherman, sea currents, or wave action, will not result in entangling of the pendant hooks and subsequent reduction of the effectiveness of the fishing rig.

It is another object of the invention to provide the use of swiveled pendant hooks which permit tethered movement of a captured fish without the fish gaining mechanical advantage, or leverage, which could facilitate detachment or destruction of the fishing rig.

It is another object of the invention to provide a means of adjustable buoyancy as determined by the inclusion and relative positioning of varying combinations of sliding annular weights and annular buoyant materials inside the cylinder body as selected by the angler, and secured in the cylinder by a threaded rod passing through the longitudinal center of the cylinder, thus securing the top and bottom end caps in the process.

It is another object of the invention to provide a provision for a removable coupled bottom end cap to the cylinder, having, in addition to a bottom pendant hook similar to that on the standard end cap, an aperture through which fish scent fluid held in a annular rubber bladder in the fishing rig's cylinder cavity is dispersed upon compression by the moment of annular weights in the cylinder body as they slide freely up and down on the threaded rod inside the cylinder as the fishing rig is manipulated by the fisherman, sea currents, or wave action.

It is another object of the invention to provide a provision for the attachment of a fabric skirt enclosing the exterior of the cylindrical fishing rig body, with the color of the skirt resembling the flesh of a squid, or dye-accepting to assume other colors, and having a fringed bottom portion which undulates to further exhibit life-like gesticulations in response to up-and-down movements of the fishing line and fishing rig by the fisherman, sea currents, or wave action, thus imitating the tentacles of a live squid.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the fishing rig comprising the invention.

FIG. 2 is a perspective view of a fringed fabric skirt for use with the fishing rig of the present invention.

FIG. 8 is a partial cross sectional view taken along lines 8—8 of the annular rubber bladder in the further alternate embodiment of the present invention.

FIG. 9 is an enlarged partial cross sectional view of a fish scent nipple on the annular rubber bladder of the further alternate embodiment of the present invention.

FIG. 10 is a cross sectional view of the cylinder showing the annular weights and the annular rubber bladder in the cylinder in the further alternate embodiment of the present invention.

DESCRIPTION OF THE PREFERRED EMBODIMENT

Figure 3:
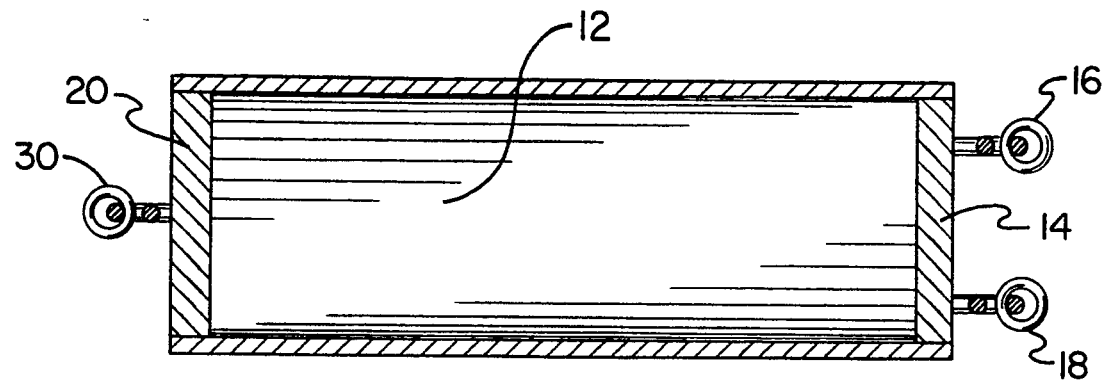
FIG. 3 is a cross sectional view of the hollow cylinder of the current invention.

With reference now to the drawings, and in particular to FIGS. 1–10 thereof, a new and improved fishing rig embodying the principles and concepts of the present invention and generally designated by the reference numeral 10 will be described.

From an overview standpoint, the fishing rig 10 is adapted for use by a human angler who fishes from a boat for deep-sea, bottom-feeding species of fish using a sport rod and reel and a fishing line in conveying the fishing rig, which imitates a primary natural prey of fish, particularly a squid, to the appropriate depth of the feeding fish. The fishing rig's mimicry of the squid is achieved through a cylindrical shape, dimensions and action in the form of the vertical up-and-down motion imparted by the angler or sea currents as enabled by adjustable buoyancy resulting from the implementation of a combination of internal annular weights and/or annular buoyant materials and an optional annular rubber bladder holding and dispersing liquid fish scent, and a fringed, undulating fabric skirt imitative of the exterior of a squid. See FIG. 2.

More specifically, the fishing rig invention comprises a hollow cylinder 12 as shown in FIG. 1. The cylinder has a top end and a bottom end. A top cap 14 is removably coupled to the top end of the cylinder. Further, a bottom cap 20 is removably coupled to the bottom end of the cylinder. Preferably, the cylinder is of a durable, non-ferrous construction for rendering it resistant to damage from contact with undersea obstructions, electrolysis and the teeth of large fish. Additionally, the cylinder has sufficient mass and an optimum shape for sustained rapid descent to desired depths.

Figure 4:
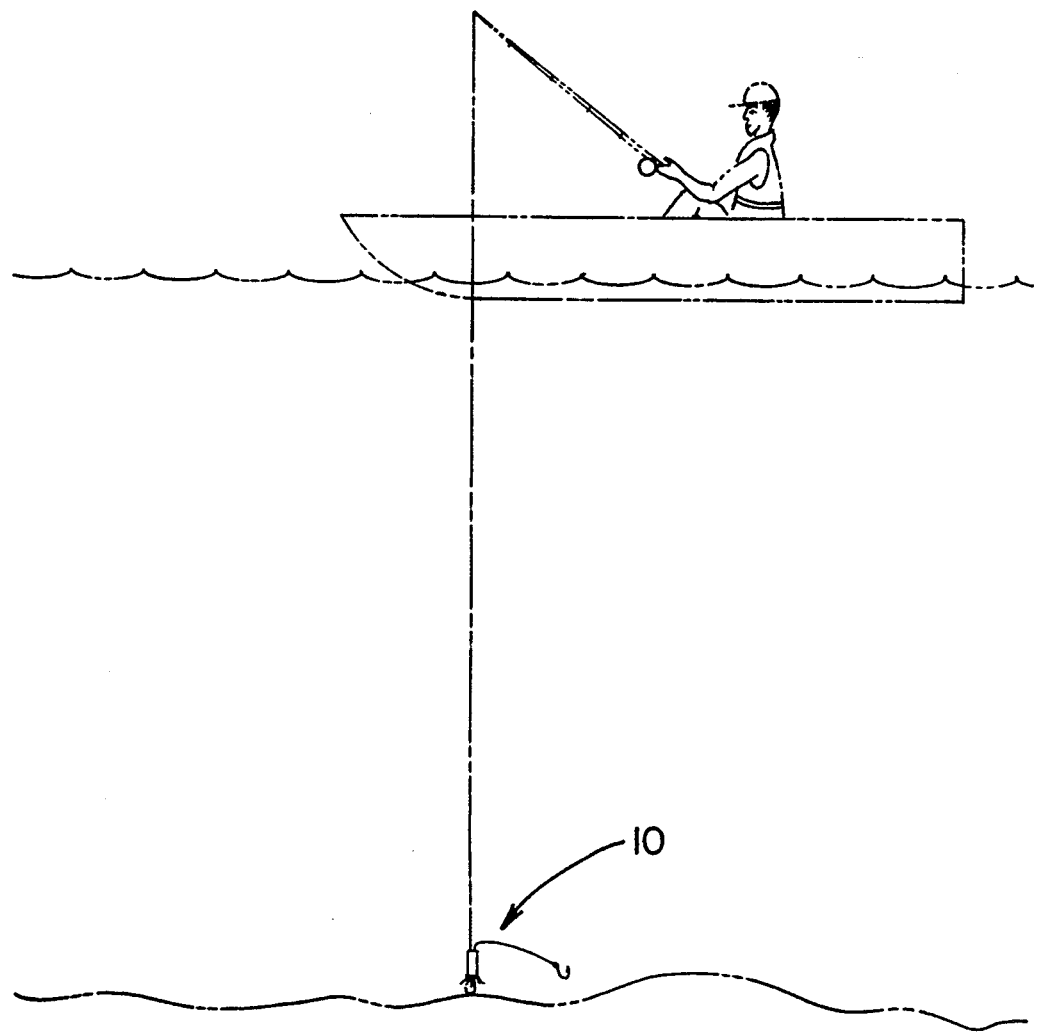
FIG. 4 is an elevation view showing the present invention use.

As shown in FIGS. 1 and 4, a first top swivel 16 is removably coupled to the top end cap 14. The swivel receives a fishing line coupled to a conventional fishing rod and reel. Additionally, a second top swivel 18 is removably coupled to the top cap. See FIG. 3. The second top swivel 18, is diametrically opposed to the first top swivel. Further, a bottom swivel 30 is removably coupled to the bottom end cap. A first hook means 24 for catching fish is operatively coupled by a crimp, sleeved metal leader 26 to the second top swivel 18. A second hook means 32 for catching fish, is operatively coupled to the bottom swivel. The second top swivel and bottom swivel accept attachment of pendant fishing hooks of various sizes and styles according to the fish sought. Suspension of the pendant hooks at a side of the cylinder by a crimp, sleeved metal leader, and underneath the cylinder by a swivel, facilitates capture of fish striking at the fishing rig from above, below, or the side. Placement of the pendant hooks also takes into consideration the up-and-down motion applied by the fisherman, sea currents, or wave action. The space between the pendant hooks prevents the hooks from entangling and thereby reducing the effectiveness of the fishing rig. The pendant hooks are operatively coupled to swivels which permit a tethered movement of any captured fish without the fish gaining mechanical advantage, leverage, which results in escape of the fish due to disengagement from the pendant hook, or destruction of the fishing rig.

Figure 5:
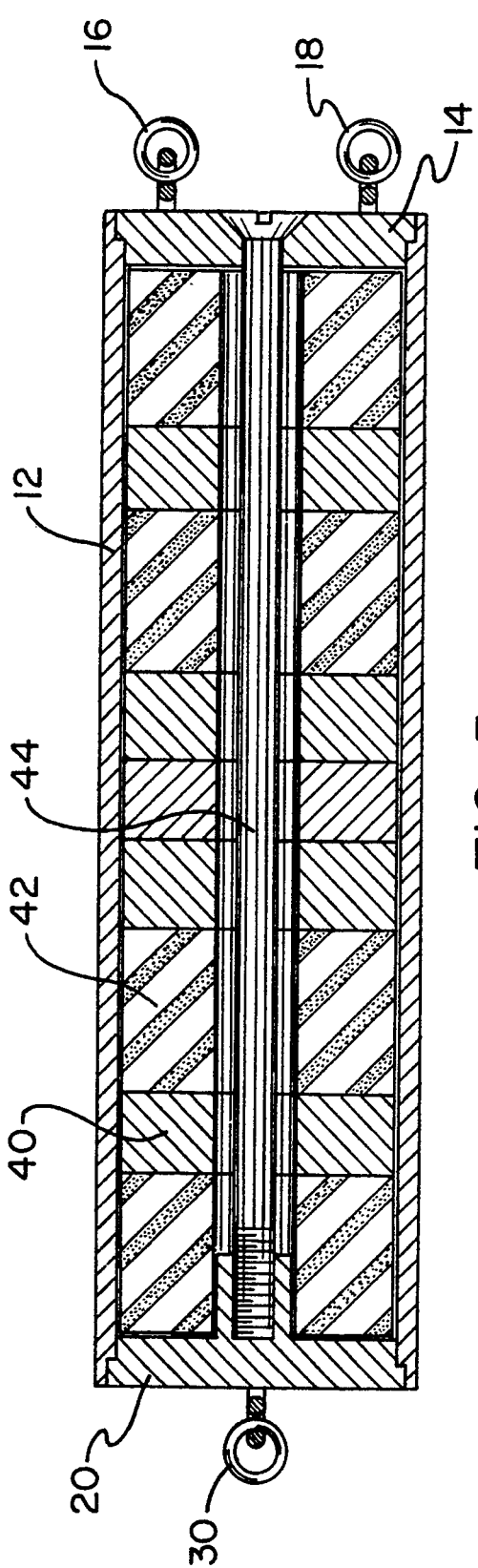
FIG. 5 is a cross sectional view of an alternate embodiment of the present invention showing annular weights and annular buoyant materials.
Figure 6:
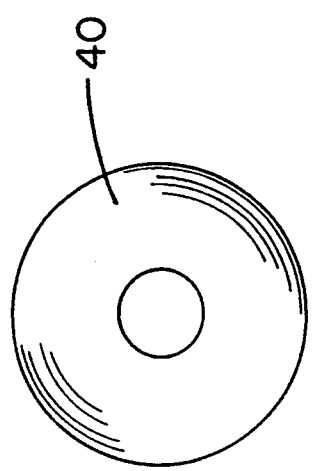
FIG. 6 is a top view of an annular weight used to adjust buoyancy of the fishing rig in the alternate embodiment of the present invention.

In an alternate embodiment, as shown in FIG. 6, annular weights 40 and annular buoyant materials 42 are positioned about an interior threaded rod 44 passing through a longitudinal center of the cylinder as shown in FIG. 5. The rod threadably engages the end caps 14 and 20. The annular weights and annular buoyant materials provide adjustable buoyancy to the fishing rig by working either in concert or independently as determined by their inclusion and relative positioning in varying combinations inside the cylinder body according to the angler's requirements.

Figure 7:
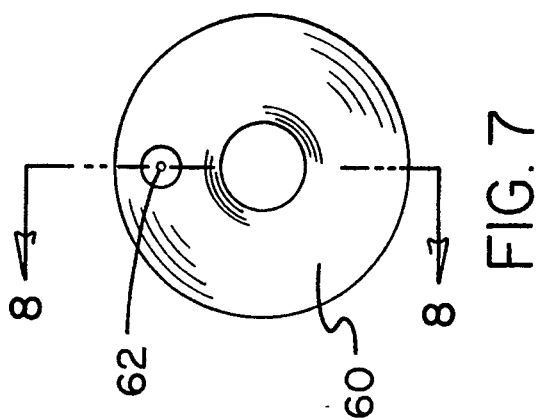
FIG. 7 is a top plan view of the annular rubber bladder showing fish scent nipple in a further alternate embodiment of the present invention.

In a further alternate embodiment, a bottom end cap 50 has an aperture 54 extending from the inside of the cylinder to the exterior thereof. Additionally, FIGS. 7, 8, & 10 illustrate that the aperture enables dispersal of fish scent fluid held in an annular rubber bladder 60 positioned within the cylinder body adjacent to the bottom end. The annular rubber bladder has a nipple 62 as shown in FIG. 9 for dispersing fish scent fluid upon compression by the moment of annular weights 40 in the cylinder body sliding freely up and down on the threaded rod 42 inside the cylinder body while the fishing rig is manipulated by the fisherman, sea currents, or wave action.

An enclosing fringed, dye-accepting fabric skirt 70 encompasses the exterior of the cylinder body, with the color of the skirt resembling the flesh of a squid, and having a fringe 72 at the bottom which undulates to further exhibit life-like gesticulations in response to up-and-down movements of the fishing line and fishing rig by the fisherman, sea currents, or wave action, thus imitating the tentacles of a live squid. See FIG. 2.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by Letters Patent of the United States is as follows:

1. A new and improved fishing rig, comprising:
   a hollow cylinder having a top end and a bottom end;
   a top cap removably coupled to the top end; a bottom cap removably coupled to the bottom end;
   a first top swivel removably coupled to the top cap for receiving a fishing line;
   a second top swivel removably coupled to the top cap diametrically opposed to the first top swivel;
   a bottom swivel removably coupled to the bottom end cap;
   a first hook means for catching fish operatively coupled to the second top swivel; and
   a second hook means operatively coupled to the bottom swivel.

2. The new and improved fishing rig of claim 1 wherein the first hook means is operatively coupled using a rust-resistant, crimp, sleeved metal leader.

3. The new and improved fishing rig of claim 1 further including means for providing adjustable buoyancy.

4. The new and improved fishing rig of claim 3 wherein the means for providing adjustable buoyancy comprises annular weights and annular buoyant materials positioned about an interior threaded rod passing through a longitudinal center of the cylinder and threadably engaging the end caps.

5. The new and improved fishing rig of claim 4 further comprising a bottom end cap having a removable coupled bottom pendant hook and an aperture extending from the inside of the cylinder to the exterior thereof.

6. The new and improved fishing rig of claim 5 further comprising an annular rubber bladder positioned within the cylinder adjacent to the bottom end, said bladder having a nipple extending through the aperture of the bottom end cap for the dispersal of fish scent fluid.

7. The new and improved fishing rig of claim 1 wherein said cylinder is fitted with a fringed, dye-accepting, fabric skirt covering the cylinder exterior.

* * * * *